US009933130B2

(12) United States Patent
Umeda

(10) Patent No.: US 9,933,130 B2
(45) Date of Patent: Apr. 3, 2018

(54) LIGHTING MEMBER

(71) Applicant: TOYODA GOSEI CO., LTD., Kiyosu-shi, Aichi-ken (JP)

(72) Inventor: Yukihiko Umeda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 24 days.

(21) Appl. No.: 15/168,855

(22) Filed: May 31, 2016

(65) Prior Publication Data

US 2017/0021761 A1 Jan. 26, 2017

(30) Foreign Application Priority Data

Jul. 24, 2015 (JP) ................................ 2015-146402

(51) Int. Cl.

| | |
|---|---|
| ***F21V 21/00*** | (2006.01) |
| ***F21V 5/00*** | (2018.01) |
| ***B60Q 3/64*** | (2017.01) |
| ***B60Q 3/20*** | (2017.01) |
| ***G02B 6/00*** | (2006.01) |
| *F21Y 115/10* | (2016.01) |

(52) U.S. Cl.

CPC ............... *F21V 5/002* (2013.01); *B60Q 3/20* (2017.02); *B60Q 3/64* (2017.02); *G02B 6/00* (2013.01); *F21Y 2115/10* (2016.08)

(58) Field of Classification Search

CPC .. F21V 5/002; B60Q 3/64; B60Q 3/20; G02B 6/00; F21Y 2115/10

USPC ....... 362/511, 352, 357, 361, 351, 355, 356, 362/358, 360

See application file for complete search history.

(56) References Cited

U.S. PATENT DOCUMENTS 4,727,461 A * 2/1988 Naumoff .................. F21V 1/06 362/352

2015/0291090 A1 10/2015 Koizumi et al.

FOREIGN PATENT DOCUMENTS

JP 2014-100980 A 6/2014

* cited by examiner

*Primary Examiner* — Karl D Frech

(74) *Attorney, Agent, or Firm* — Posz Law Group, PLC

(57) ABSTRACT

A lighting member includes a light guiding element, and a housing including a cover element and a light-guiding-element attachment claw. The cover element is formed as a frame shape, is capable of deforming elastically, and covers an outer peripheral face of the light guiding element over the entire circumference. The light-guiding-element attachment claw is disposed integrally with the cover element, and protrudes diametrically toward an inner side beyond the outer peripheral face of the light guiding element. The housing has an inner peripheral face facing the outer peripheral face of the light guiding element, and further includes a larger-clearance portion and smaller-clearance portion. The larger-clearance portion provides a larger clearance between the inner peripheral face of the cover element and the outer peripheral face of the light guiding element than does the smaller-clearance portion between them.

11 Claims, 5 Drawing Sheets

LIGHTING MEMBER

INCORPORATION BY REFERENCE

The present invention is based on Japanese Patent Application No. 2015-146402, filed on Jul. 24, 2015, the entire contents of which are incorporated herein by reference

BACKGROUND OF THE INVENTION

Field of the Invention

The present invention relates to a lighting member, which comprises a light guiding element and a housing.

Description of the Related Art

As a type of lighting members, a lighting member comprising a light guiding element to be connected to a light source has been known. In this sort of lighting member, light, which the light source emits, enters the inside of the light guiding element by way of an end face of the light guiding element. The light guiding element appears to shine or gleam, because the light entered the interior of the light guiding element reflects inside the light guiding element, or because the entered light emits to the outside via a surface of the light guiding element. The light guiding element thus shining gives to the lighting member various decorations that depend on a configuration of the light guiding element or shining parts of the light guiding element's configuration.

Japanese Unexamined Patent Publication (KOKAI) Gazette No. 2014-100980, for instance, proposes such an engineering technique as covering a light guiding element partially by a material with low light transmissivity in order to diversify a decoration that the light guiding element displays. In a lighting member disclosed in the gazette, the light guiding element is held by and between two separated bodies (i.e., a decorative panel, and a decorated bezel) that constitute a housing. Consequently, some part of the light guiding element is visible through a clearance between the two separated bodies, and the other part is covered with the two separated bodies. That is, in accord with configurations or the clearance between the two separated bodies, the disclosed lighting member displays optical decorations that result from the light guiding element.

However, such a type of lighting member is associated with a problem of high manufacturing cost, because it requires a large quantity of component parts for the housing. Moreover, the lighting member also has such other problems as a bulky housing and attachment workability of the light guiding element onto the housing, or vice versa, which is less likely to be upgraded, because it necessitates a structure for engaging the two separated bodies making the housing with one another.

SUMMARY OF THE INVENTION

The present invention has been developed in view of the aforementioned circumstances. It is therefore an object of the present invention to provide a lighting member that comprises component parts in a less quantity, and which excels in workability of attaching a light guiding element onto a housing, or vice versa.

For example, alighting member according to the present invention, which achieves the aforementioned object, comprises:

a light guiding element having an outer peripheral face; and a housing including a cover element formed as a frame shape, being capable of deforming elastically and covering the outer peripheral face of the light guiding element over an entire circumference thereof, and a light-guiding-element attachment claw disposed integrally with the cover element, and protruding toward an inner side that is present on a more inside than is the outer peripheral face of the light guiding element;

the cover element of the housing having an inner peripheral face facing the outer peripheral face of the light guiding element;

the cover element including a larger-clearance portion providing a large clearance between the inner peripheral face of the cover element and the outer peripheral face of the light guiding element, and a smaller-clearance portion providing therebetween a small clearance, which is smaller than the large clearance that the larger-clearance portion provides.

The lighting member according to the present invention thus has the component parts in a less quantity, and also offers superb workability for workers or assembly robots upon attaching or fitting the light guiding element onto the housing, or vice versa.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, ail of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, a lighting member according to the present invention will be described in detail while giving the specific examples.

First Embodiment

A lighting member according to First Embodiment is one of the specific examples that embody a lighting member according to the present invention as a drink- or beverage-container holder for vehicle.

Figure 1:
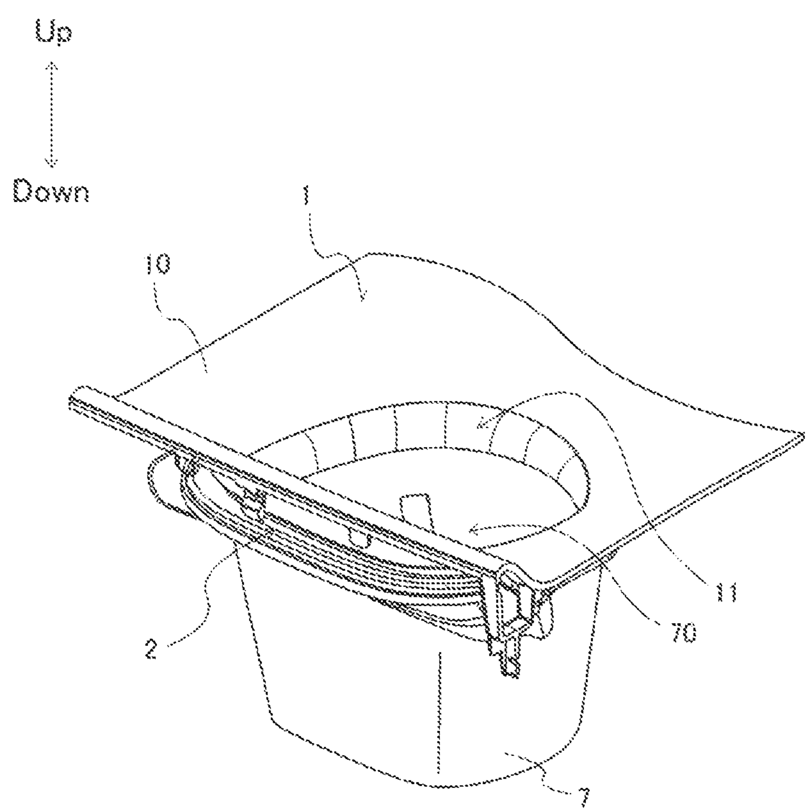
FIG. 1 is a perspective view for schematically illustrating a lighting member according to First Embodiment of the present invention.
Figure 2:
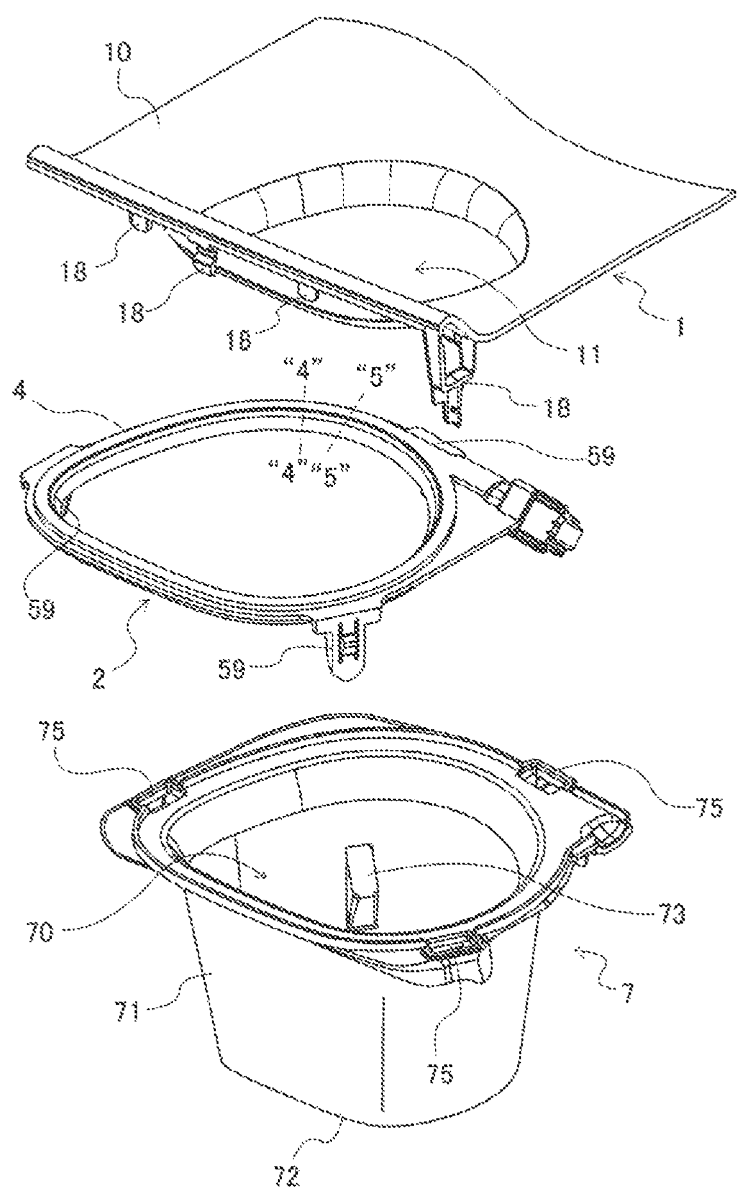
FIG. 2 is an exploded perspective view for schematically illustrating how the present lighting member according to First Embodiment appears when it is exploded partially.
Figure 3:
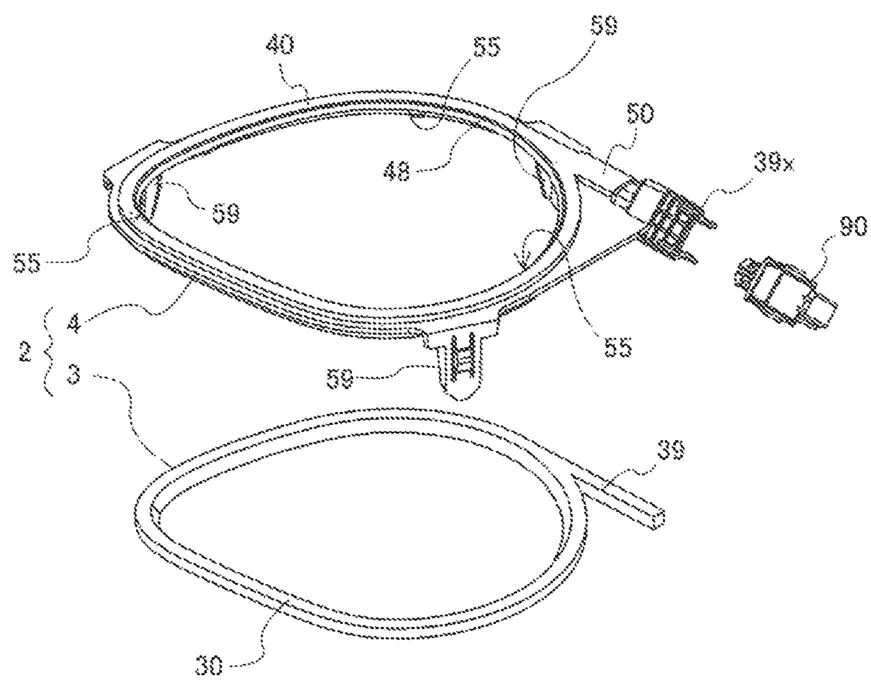
FIG. 3 is a major-part exploded perspective view for schematically illustrating a light guiding element and housing of the present lighting member according to First Embodiment.
Figure 4:
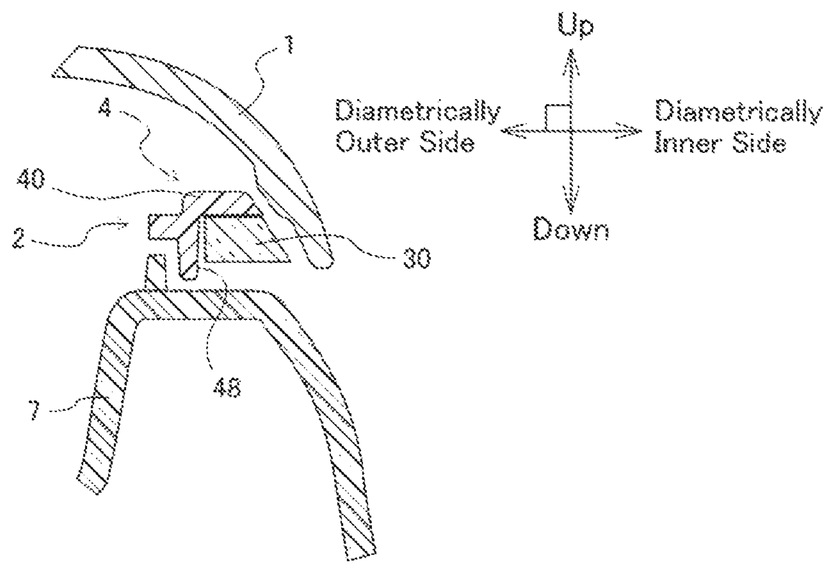
FIG. 4 is a cross-sectional view for schematically illustrating across section of the present lighting member according to First Embodiment taken along the "4"-"4" line in FIG. 2.
Figure 5:
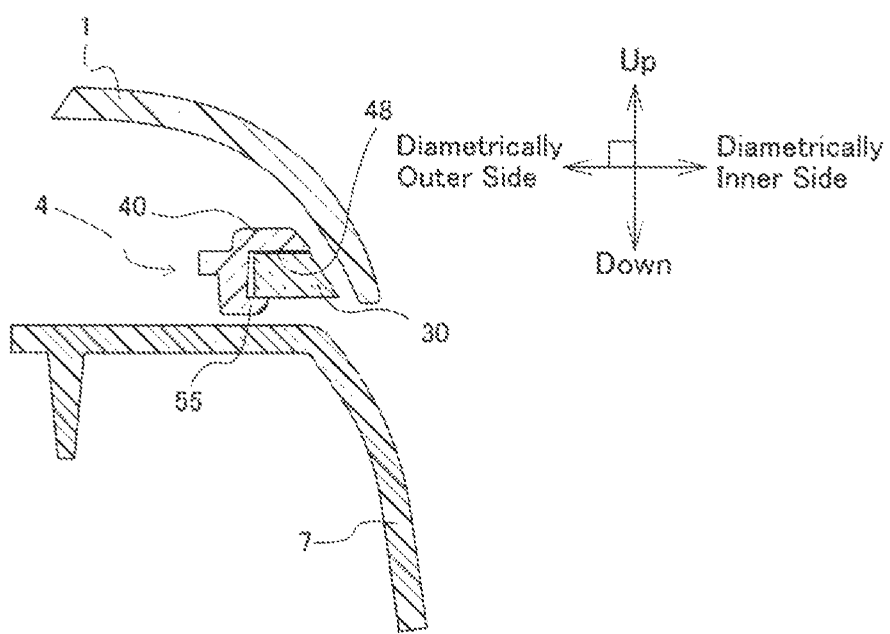
FIG. 5 is a cross-sectional view for schematically illustrating another cross section of the present lighting member according to First Embodiment taken along the "5"-"5" line in FIG. 2.
Figure 6:
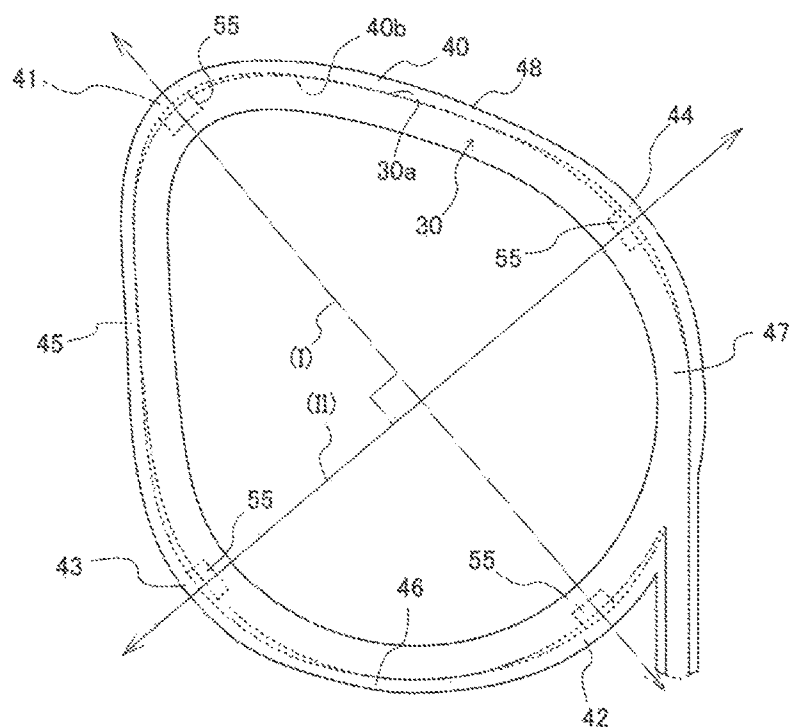
FIG. 6 is an explanatory diagram for schematically illustrating clearances between the light guiding element and the housing in the present lighting member according to First Embodiment.
Figure 7:
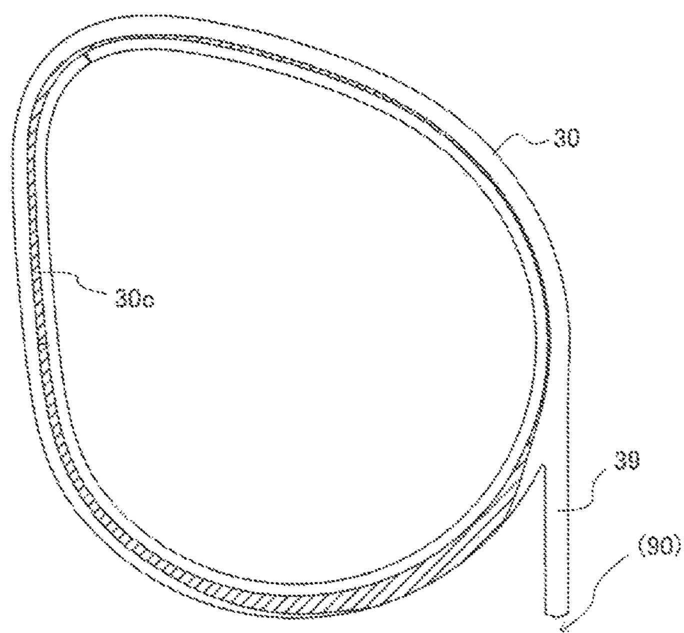
FIG. 7 is a top-face view for schematically illustrating how the light guiding element of the present lighting member according to First Embodiment appears when it is viewed from the upper side in FIG. 1.

FIG. 1 illustrates the present lighting member according to First Embodiment schematically in a perspective view. FIG. 2 illustrates schematically how the present lighting member according to First Embodiment appears in a partially-exploded perspective view. FIG. 3 illustrates major parts of a light guiding element and housing of the present lighting member according to First Embodiment in an exploded perspective view. FIG. 4 illustrates a cross section of the present lighting member according to First Embodiment schematically in a cross-sectional view taken along the "4"-"4" line in FIG. 2. FIG. 5 illustrates a cross section of the present lighting member according to First Embodiment schematically in a cross-sectional view taken along the line "5"-"5" line in FIG. 2. FIG. 6 illustrates clearances between the light guiding element and the housing in the present lighting member according to First Embodiment in an explanatory diagram. Note that FIG. 6 is a drawing in which the present lighting member according to First Embodiment is viewed from above. FIG. 7 illustrates how the light guiding element of the present lighting member according to First Embodiment appears schematically in a top-face view when it is viewed from the upper side in FIG. 1. Hereinafter, the terms, "up," "down," "diametrically outer side" and "diametrically inner side" designate the "up," "down," "diametrically outer side" and "diametrically inner side" shown in FIGS. 1, 4 and 5, respectively.

The present lighting member according to First Embodiment makes a drink- or beverage-container holder to be installed in a vehicular console box. As illustrated in FIGS. 1 and 2, the present lighting member according to First Embodiment comprises a cover element 1, a lighting element 2, and a container retaining element 7. The lighting element 2 is arranged under the cover element 1. The container retaining element 7 is arranged further down below under the cover element 1 and lighting element 2.

The cover element 1 not only covers the lighting element 2 from up above, but also makes a part that forms some of the top face of a not-shown console box. That is, the cover element 1 has a top face 10 that is exposed to the exterior of the console box. The cover element 1 is formed as a plate shape substantially, and includes a through-hole-shaped cover inlet/outlet port 11 at a position facing an accommodation opening 70 in the container retaining element 7 described later. The cover inlet/outlet port 11 makes an inlet/outlet port that enables a user to put a container in and take it from out of the container retaining element 7. The cover element 1 is provided with a plurality of cover-element engagements 18 that engage with not-shown console-box engagements with which the console box is provided. The cover engagements 18 engage with the console-box engagements to install the cover element 1 to the console box.

The container retaining element 7 is a constituent element that accommodates therein various not-shown containers represented by cans, plastic bottles, mugs or caps. The container retaining element 7 is equivalent to a "base element" claimed in accordance with the present invention. The container retaining element 7 is formed as a box shape substantially, and is provided with a side wall 71 and bottom wall 72. Moreover, the container retaining element 7 not only accommodates a container in an accommodation space demarcated and formed in the interior, but also supports a not-shown bottom face of the container with the bottom wall 72 and a not-shown side face of the container with the side wall 71 as well, if needed. In addition, the side wall 71 of the container retaining element 7 is equipped with a support protrusion 73 that can come in and go from out of the side wall 71. The support protrusion 13 is urged toward the interior of the container retaining element 7 to support the side face of the container, if needed.

The container retaining element 7 is further provided with three engagement retainers 75 that have a hole respectively. The engagement retainers 75 are put in place adjacent to an opening end rim of the accommodation opening 70 in the container retaining element 7 so as to separate from each other at intervals in the circumferential direction. The engagement retainers 75 engage with later-described container-retaining-element attachment claws or tongues 59 of the lighting element 2. The engagement retainers 75 engage with the container-retaining-element attachment tongues 59 to integrate the container retaining element 7 with the lighting element 2.

The lighting element 2 is formed as a letter-"Q" shape substantially, and comprises a light guiding body 3 and a housing 4, as shown in FIG. 3. The light guiding body 3 is made of a transparent acrylic resin, and is capable of transmitting light. The housing 4 is made of a colored resin, and exhibits an ability of blocking light.

As illustrated in FIG. 3, the light guiding body 3 is formed as a letter-"Q" shape as well. Of the letter-"Q" shape, a part, which is formed as a ring shape substantially, is referred to as a light guiding element 30, and the other part, which follows the light guiding element 30 continuously to be formed as a letter-"I" shape substantially, is referred to as a light introducing element 39. An LED light source 90 is connected to the light introducing element 39. A protruded end of the light introducing element 39 makes an attachment section 39*x* to be attached to the LED light source 90.

As illustrated in FIG. 3, the housing 4 comprises a cover element 40, a sub-cover element 50, light-guiding-element attachment claws or tabs 55, and the container-retaining-element attachment tongues 59. As illustrated in FIGS. 3 and 6, the cover element 40 is formed virtually as a ring shape, which corresponds to the light guiding element 30, when it faces upward. The cover element 40 thus covers the light guiding element 30. The sub-cover element 50 follows the cover element 40 continuously, and is formed virtually as a letter-"I" shape, which corresponds to the light introducing element 39. The sub-cover element thus covers the light introducing element 39. The light-guiding-element attachment tabs 55 are disposed integrally with the cover element 40 to protrude from a lower part of the cover element 40 toward a diametrically inner side of the cover element 40, respectively.

As illustrated in FIGS. 3 and 4, the cover element 40 is provided with a groove 48 that opens on the diametrically inner side and lower side. In other words, the groove 48 opens on the diametrically inner side of the cover element 40 (that is, on an inner circumferential side of the cover element 40), and on the lower side (that is, on aside facing the container retaining element 7). As a result, a cross section, in which the cover element 40 is cut in the up/down direction, is formed as a letter-"L" shape substantially, as shown in FIG. 4. The light guiding element 30 of the light guiding body 3 is accommodated in the groove 48. Therefore, it is possible to say that the housing 4 comprising such a cover element 40 is formed virtually as a frame shape that covers the light guiding element 30. To put it more differently, the cover element 40 not only covers the entire circumference of an outer peripheral face 30*a* in the light guiding element 30, but also covers the entire face of a top face in the light guiding element 30. Note that, at positions where the light-guiding-element attachment tabs 55 are present, the light-guiding-element attachment tabs 55 protrude on an underside of the groove 48, respectively, as shown in FIG. 5.

As illustrated in FIG. 6, the present lighting member according to First Embodiment comprises the cover element 40 whose inner circumferential configuration is formed as a teardrop shape, not as a true-circular shape. That is the cover element 40 is formed as a non-true-circular shape in the inner circumference. Note that the double-headed arrow direction "I" shown in FIG. 6 will be hereinafter referred to as a "first axis direction 'I'," and the other double-headed arrow direction "II" shown in the drawing will be hereinafter referred to as a "second axis direction 'II'." The first axis direction "I" is a direction in which the cover element 40 has a maximum diameter. Moreover, one of the opposite sections of the cover element 40 in the first axis direction "I" will be hereinafter referred to a "first larger-clearance portion 41," and the other one of the opposite sections of the cover element 40 in the first axis direction "I" will be hereinafter referred to a "second larger-clearance portion 42." The first larger-clearance portion 41 is a section at which the cover element 40 exhibits the maximum curvature. The second axis direction "II" is a direction crossing at right angles to or intersecting with the first axis direction "I" perpendicularly. In addition, of the innumerably available straight lines that extend in the second axis direction "II" crossing at right angles to or intersecting with the first axis direction "I" perpendicularly, a later-described third larger-clearance portion 43 and fourth larger-clearance portion 44 are arranged especially on one of the straight lines that exhibits the maximum distance in the second axis direction "II" between the two intersection points with the cover element 40. Note that, the phrase, "a direction crossing at right angles to or intersecting with another direction perpendicularly," involves such a concept as "directions crossing at substantially right angles to or intersecting with another direction substantially perpendicularly." Accordingly, the phrase allows an error of ±10 degrees.

Moreover, one of the opposite sections or the cover element 40 in the second axis direction "II" will be hereinafter referred to a "third larger-clearance portion 43," and the other one of the opposite sections of the cover element 40 in the second axis direction "II" will be hereinafter referred to a "fourth larger-clearance portion 44." The first through fourth larger-clearance portions (41 through 44) are equivalent to a claimed "larger-clearance portion" in a lighting member according to the present invention, respectively. The first through fourth larger-clearance portions (41 through 44) are laid out in the following order in a later-described optical flow direction: the fourth larger-clearance portion 44; the first larger-clearance portion 41; the third larger-clearance portion 43; and the second larger-clearance portion 42.

The cover element 40 covers the outer peripheral face 30*a* of the light guiding element 30 on the entire circumference. The inner peripheral face 40*b* of the cover element 40, and the outer peripheral face 30*a* of the light guiding element 30 face one another. The clearance between the inner peripheral face 40*b* of the cover element 40 and the outer peripheral face 30*a* of the light guiding element 30 is larger at the first larger-clearance portion 41, second larger-clearance portion 42, third larger-clearance portion 43 and fourth larger-clearance portion 44 than the clearance therebetween at the other parts. Note that the cover element 40 and the light guiding element 30 are put in place without any clearance substantially between the inner peripheral face 40*b* of the cover element 40 and the outer peripheral face 30*a* of the light guiding element 30 at a first smaller-clearance portion 45 placed between the first larger-clearance portion 41 and the third larger-clearance portion 43, at a second smaller-clearance portion 46 placed between the third larger-clearance portion 43 and the second larger-clearance portion 42, at a third smaller-clearance portion 47 placed between the second larger-clearance portion 42 and the fourth larger-clearance portion 44, and at a fourth smaller-clearance portion 48 placed between the fourth larger-clearance portion 44 and the first larger-clearance portion 41.

Moreover, the first larger-clearance portion 41, the second larger-clearance portion 42, the third larger-clearance portion 43, and the fourth larger-clearance portion 44 are provided with each one of the light-guiding-element attachment tabs 55, respectively. The respective light-guiding-element attachment tabs 55 protrude from an underside of the cover element 40 toward a diametrically inner side of the cover element 40, as described above.

Incidentally, each of the light-guiding-element attachment tabs 55 makes a section that protrudes toward a diametrically inner side of the cover element 40 to engage with the light guiding element 30. Accordingly, the light-guiding-element attachment tabs 33 interfere with the light guiding element 30, as shown in FIG. 6. Consequently, It is difficult to assemble the light guiding element 30 with the cover element 40 just as they are.

However, the present lighting member according to First Embodiment comprises the housing 4 made of polypropylene (or so-called "PP"). Although the housing 4 does not exhibit such a large magnitude of deformation, it is capable of deforming elastically. It is needless to mention that the cover element 40 constituting some of the housing 4 is also capable of deforming elastically. Therefore, the present lighting member according to First Embodiment makes it feasible to put the cover element 40 on the light guiding element 30 while deforming the cover element 40 without ever deforming the light guiding element 30, when the cover element 40 is attached onto the light guiding element 30.

More specifically, an operator or assembly robot first applies a force to the cover element 40 in the first axis direction "I" shown in FIG. 6 when carrying out the attachment. That is, the operator or assembly robot applies to the cover element 40 a tensile-direction force acting toward the opposite leading-end sides of the arrow "I" in FIG. 6, namely, a force for enlarging the cover element 40 diametrically. On this occasion, although the cover element 40 does not change greatly in the circumferential length, the cover element 40 elongates in the first axis direction "I," but crushes in the second axis direction "II," so that it deforms into a substantially diamond configuration as a whole. That is, the first larger-clearance portion 41, and the second larger-clearance portion 42 change the positions in a direction separating away from one another along the first axis direction "I," whereas the third larger-clearance portion 43, and the fourth larger-clearance portion 44 change the positions in another direction approaching one another along the second axis direction "II." Accordingly, the diametrically inner-side end of the light-guiding-element attachment tabs 55, with which the first larger-clearance portion 41 and second larger-clearance portion 42 are provided, are put in place on a more outer side than is the outer peripheral face 30*a* of the light guiding element 30. Consequently, the light-guiding-element attachment tabs 55, with which the first larger-clearance portion 41 and second larger-clearance portion 42 in the cover element 40 are provided, go over the light guiding element 30 to readily engage with a lower face of the light guiding element 30.

Note that the present lighting member according to First Embodiment effects the same advantage as described above even when the operator or assembly robot applies to the cover element 40 a compression-direction force in directions against the second axis direction "II," namely, a force for diminishing the cover element 40 diametrically, instead of the application of the tensile-direction force in the first axis direction "I," under the aforementioned circumstances.

Subsequently, the operator or assembly robot applies a force to the cover element 40 in the second axis direction "II" shown in FIG. 6. That is, the operator or assembly robot applies to the cover element 40 a tensile-direction force acting toward the opposite leading-end sides of the arrow "II" in FIG. 6, namely, a force for enlarging the cover element 40 diametrically. Then, the cover element 40 deforms into a diamond configuration substantially as a whole, diamond configuration which is elongated in the second axis direction "II" hut is crushed in the first axis direction "I." In other words, the third larger-clearance portion 43, and the fourth larger-clearance portion 44 change the positions in a direction separating away from one another along the second axis direction "II," whereas the first larger-clearance portion 41, and the second larger-clearance portion 42 change the positions in another direction approaching one another along the first axis direction "I." Accordingly, the diametrically inner-side end of the light-guiding-element attachment tabs 55, with which the third larger-clearance portion 43 and fourth larger-clearance portion 44 are provided, are put in place on a more outer side than is the outer peripheral face 30*a* of the light guiding element 30. Consequently, the light-guiding-element attachment tabs 55, with which the third larger-clearance portion 43 and fourth larger-clearance portion 44 in the cover element 40 are provided, can be readily engaged with the light guiding element 30, on this occasion.

Note that the present lighting member according to First Embodiment effects the same advantage as described above even when the operator or assembly robot applies to the cover element 40 a compression-direction force in directions against the first axis direction "I," namely, a force for diminishing the cover element 40 diametrically, instead of the application of the tensile-direction force in the second axis direction "II," under the aforementioned circumstances.

Hence, the present lighting member according to First Embodiment excels in the attachment workability of the housing 4 onto the light guiding element 30, or vice versa. Moreover, since the present lighting member according to First Embodiment comprises the housing 4 including the cover element 40 that engages with the light guiding element 30 directly, it. can be completed with a less quantity of component parts, contrary to conventional lighting members.

Moreover, prior to the attachment onto the light guiding element 30, the cover element 40 has clearances between the first through fourth larger-clearance portions (41 through 44) and the light guiding element 30. The clearances function as a deformation allowance for the cover element 40, respectively. That is, the clearances also make the first through fourth larger-clearance portions (41 through 44) in the cover element 40 deform readily to upgrade the attachment workability of the housing 4 onto the light guiding element 30, or vice versa.

In addition, before being attached onto the light guiding element 30, the cover element 40 has small clearances between the first through fourth smaller-clearance portions (45 through 48) and the light guiding element 30, or does not provide any clearance between the first through fourth. smaller-clearance portions (45 through 48) and the light guiding element 30. Consequently, the first through fourth smaller-clearance portions (45 through 48) come in contact with the light guiding element 30 when the first through fourth larger-clearance portions (41 through 44) deform as described above. That is, the first through fourth smaller-clearance portions (45 through 48) function as a section for positioning the cover element 40 to the light guiding element 30, respectively. The first through fourth smaller-clearance portions (45 through 48) thus functioning also upgrade the attachment workability of the housing 4 onto the light guiding element 30, or vice versa. Therefore, the first through fourth larger-clearance portions (41 through 44) and first through fourth smaller-clearance portions (45 through 48), which operate cooperatively, enable manufacturers to manufacture the present lighting member according to First Embodiment inexpensively and with ease.

Note that the present lighting member according to First Embodiment comprises the cover element 40 including four larger-clearance portions (i.e., the first through fourth larger-clearance portions (41 through 44)) and four smaller-clearance portions (i.e., the first through fourth smaller-clearance portions (45 through 48)) that are put in place alternately, as illustrated in FIG. 6. However, it is allowable that the cover element of a light member according to the present invention can include the larger-clearance portion and smaller-clearance portion in a quantity of one, respectively. Moreover, it is not limited at all in terms of the number, size and location of the larger-clearance portion and smaller-clearance portion.

Moreover, in the present lighting member according to First Embodiment comprising the assembled cover element 40 and light guiding element 30, the larger-clearance portions (i.e., the first through fourth larger-clearance portions (41 through 44)) provide clearances between the inner peripheral face 40*b* of the cover element 40 and the outer peripheral face 30*a* of the light guiding element 30, whereas the smaller-clearance portions (i.e., the first through fourth smaller-clearance portions (45 through 48)) hardly provide any clearance between the inner peripheral face 40*b* of the cover element 40 and the outer peripheral face 30*a* of the light guiding element 30. However, it is also allowable in a lighting member according to the present invention that the smaller-clearance portions can provide clearances between the inner peripheral face 40*b* of the cover element 40 and the outer peripheral face 30*a* of the light guiding element 30 as far as the resultant clearances are smaller than the clearances that the larger-clearance portions provide. In addition, it is even permissible that the inner peripheral face 40*b* of the cover element 40 can come in press contact with the outer peripheral face 30*a* of the light guiding element 30 at the smaller-clearance portions. In either case, the thus disposed larger-clearance portions and smaller-clearance portions make the lighting member according to the present invention excel in the attachment workability between the housing 4 and the light guiding element 30.

In both of the above-described cases, it is allowable that the cover element 40 can have an inner circumferential length that is set to be equal to or more than an outer circumferential length that the light guiding element 30 has. Moreover, it is more preferable that the cover element 40 can include the larger-clearance portions in a quantity of two or more. In addition, it is much more preferable that the cover element 40 can include the larger-clearance portions that are put in place at equal intervals.

Moreover, the present lighting member according to First Embodiment comprises the housing 4 including the container-retaining-element attachment tongues 59, as shown in FIG. 2. The container-retaining-element attachment tongues 59 are equivalent to a claimed "base-element attachment claw," respectively. The container-retaining-element attachment tongues 59 engage with the engagement retainers 75 with which the container retaining element 7 is provided. The container-retaining-element attachment tongues 59 engaging with the engagement retainers 75 integrate the container retaining element 7 with the housing 4. The container-retaining-element attachment tongues 59 are put in place at the second smaller-clearance portion 46, third smaller-clearance portion 47 and fourth smaller-clearance portion 48 in the cover element 40. That is, the container-retaining element attachment tongues 59 are disposed at positions that avoid or stay away from the larger-clearance portions (41 through 44), namely, at the smaller-clearance portions (46 through 48) in the present lighting member according to First Embodiment.

The container-retaining-element attachment tongues 59, which are formed in a pronged or projected shape, function as reinforcement ribs. Accordingly, some of the sections in the cover element 40, which are provided with the container-retaining-element attachment tongues 59, might sometimes be less likely to deform under certain circumstances. However, the cover element 40 can be provided with the container-retaining-element attachment tongues 59, without ever hindering deformations of the larger-clearance portions (i.e., the first through fourth larger-clearance portions (41 through 44)) considerably, by putting the container-retaining-element attachment tongues 59 in place at the sections other than the larger-clearance portions (i.e., the first through fourth larger-clearance portions (41 through 44)), namely, by putting them in place at the sections that are not required to deform greatly. Thus, the present lighting element according to First Embodiment also excels in the attachment workability of the base element (i.e., the container retaining element 7) to the light guiding body 3, or vice versa, in conjunction with the attachment workability between the housing 4 and the light guiding element 30.

The groove 48 formed in the housing 4 opens in the diametrically inner side and underside of the housing 4. Accordingly, light, which travels in the light guiding element 30 accommodated within the groove 48, advances toward the diametrically inner side and underside of the housing 4. However, as lustrated in FIGS. 4 and 5, the cover element 1 covers the diametrically inner side and underside of the housing 4. Consequently, the light transmitting through the light guiding element 30 illuminates the lighting element 2 on the lower side alone. The present lighting member according to First Embodiment comprises the lighting element 2 that is put in place above the container retaining element 7. Therefore, the lighting element 2 in the present lighting member according to First Embodiment illuminates the container retaining element 7 from above toward down below. Accordingly, in the present lighting member according to First Embodiment, namely, a drink- or beverage-container holder, the container retaining element 7 is illuminated in the form of a ring on the upper section in the interior. Consequently, the light gives a decoration to the drink- or beverage-container holder. Moreover, since the light produces an illumination at an inlet section of the drink- or beverage-container holder, namely, at the accommodation opening 70, a user can recognize the inlet section of the drink- or beverage-container holder visually even under such usage environments as nighttime where the light amount is less. That is, the present lighting member according to First Embodiment can give excellent usability to drink- or beverage-container holders.

The present lighting member according to First Embodiment embodies the present invention as a drink- or beverage-container holder. However, it is allowable that a lighting member according to the present invention can comprise the light guiding element 30 and housing 4 alone. For example, only the lighting element 2 directed to the present lighting member according to First Embodiment can permissibly make a lighting member according to the present invention. Moreover, in the present lighting member according to First Embodiment, the light guiding element 30 and housing 4 are formed as a substantially ring shape, respectively, and the lighting element 2 is formed as a ring shape as a whole. However, the configuration of a lighting member according to the present invention is not limited to those at all. That is, it is also allowable that a lighting member according to the present invention can be formed as a hollow ring shape like that of the lighting element 2 in the present lighting member according to First Embodiment. Alternatively, it is even permissible to form a lighting member according to the present in a sold configuration. For example, it is allowable to use a disk-shaped light guiding element 30 and then to cover the disk shaped light guiding element 30 with the housing 4. Also in these instances, it is feasible to display a decoration that depends on the configuration of the light guiding element 30. It is possible to embody such a lighting member as vehicular scuff plates or emblems, for instance. In addition, when such a lighting element 2 with a solid configuration makes the bottom of a drink- or beverage-container holder, for instance, it is also possible to cause the drink- or beverage-container holder to shine or gleam on the inner side from the bottom.

In the light guiding element 30 shown in FIG. 7, the hatched section designates a region 30*c* that is subjected to a light diffusion treatment. Note that, in the present specification, the term, a "light diffusion treatment," implies treatments, in general, for forming a light-diffusion reflective pattern onto a surface of the light guiding element 30. Specifically, as a method of forming the light-diffusion reflective pattern, it is possible to exemplify the following methods: subjecting a surface of the light guiding element 30 to a surface roughening treatment, such as wrinkling or matting processes or blast treatments; and a method of forming a light reflection diffusive layer on a surface of the light guiding element 30 by printing with a light-reflection diffusive ink or applying a light reflection diffusive tape onto the surface. Carrying out a light diffusion treatment results in enabling light, which passes through the inside of the light guiding element 30, to diffusively reflect at the surface of the light guiding element 30. That is, the section undergone a light diffusion treatment shines most intensely of all the sections in the light guiding element 30.

Incidentally, in the light guiding element 30, the sections more away from the LED light source 90 are generally less likely to shine than the sections closer to the light source 90. Therefore, in the present lighting member according to First Embodiment, not only the light guiding element 30 is provided with the region 30*c*, which is subjected to a light diffusion reflection treatment, but also the region 30*c* undergone the light-diffusion reflection treatment is made larger as it gets away from the light source 90, namely, toward the downstream side in the optical flow direction. As a result, the light guiding element 30 shines or gleams uniformly as a whole.

Moreover, light, which passes through the inside of the light guiding element 30, is generally likely to emit to the outside of the light guiding element 30 at a section of the light guiding element 30 with a large curvature. In the present lighting member according to First Embodiment, the first larger-clearance portion 41 is a section with the largest curvature in the light guiding element 30, and accordingly makes a section from which the light is likely to emit to the outside of the light guiding element 30. In general, such a section is likely to shine intensely. Consequently, in the present lighting member according to First Embodiment, the region 30*c* undergone a light-diffusion reflection treatment is further made to have a smaller area on an upstream side in the optical flow direction, once it goes across the first larger clearance portion 41 opposite to the optical flow direction. The thus designed region 30*c* throttles an amount of the light that tries to emit from the first larger-clearance portion 41 to the outside of the light guiding element 30. As a result, it is possible to inhibit the first larger-clearance portion 41 from shining intensely more than necessary. Additionally, the thus arranged region 30*c* makes it possible to supply an ample amount of the light to sections of the light guiding element 30 that are present on a more downstream side in the optical flow direction than is the first larger-clearance portion 41. The operations of the region 30*c* cooperatively enable the present lighting member according First Embodiment to shine or gleam with substantially uniform intensity at the light guiding element 30.

It is allowable that a lighting member according to the present invention can comprise the light guiding element 30 and cover element 40 whose inner circumference has either a ring shape making a true circle, or the other configuration. However, the present lighting member according to First Embodiment is designed daringly so as to comprise the cover member 40 whose inner circumference is formed as a non-true-circular ring shape that has the first axis direction “I” and second axis direction “II” to enable the cover member 40 to deform relatively greatly, in order to upgrade the attachment workability of the housing 4 onto the light guiding element 30, or vice versa. In the meantime, however, a section with a large curvature arises in the light guiding element 30, because the light guiding element 30 is made to have an inner circumference formed as a non-true-circular ring shape to correspond or fit to the configuration of the cover element 40. As discussed above, uneven shining might potentially occur in the light guiding element 30 having a section with a large curvature. On the contrary, however, the uneven shining in the light guiding element 30 is reduced so as to enable the light guiding element 30 to shine or gleam uniformly as a whole, because the light guiding member 30 is subjected to a light diffusion treatment and its region 30*c* undergone the light diffusion treatment is optimized in the size for every section in the light guiding element 30, as described above. That is, the engineering techniques directed to the present lighting member according to First Embodiment make it possible to provide lighting members that can be manufactured readily and inexpensively, and whose light guiding member 30 shines or gleams uniformly.

Moreover, the light introducing element 39 makes at the protruded end a convex lens that curves in a convex shape toward the opposing LED light source 90, as shown in FIG. 7. In a common lighting member, since light travels in complicated optical paths at the connected section between the light introducing element 39 and the light guiding element 30, the light leaks from the connected section so that the connected section is likely to shine intensely. However, in the present lighting member according to First Embodiment, since the light introducing element 39 has a convex-lens-shaped incident face at the protruded end, incident light falling on the light introducing element 39 is enhanced in the rectilinearity. Accordingly, reflections of the light are reduced at the connected section. Consequently, it is possible to augment an amount of the light that is supplied from the light introducing element 39 to the light guiding element 30. Therefore, the present lighting member according to First Embodiment can inhibit such a trouble as the connected section has shined intensely. As a result, the entire light guiding element 30 can shine or gleam uniformly and brightly.

INDUSTRIAL APPLICABILITY

Since a lighting member according to the present invention is not restricted at all in terms of the use or application, it is possible to dispose the present lighting member in various apparatuses or instruments, or fixtures. For example, it is possible to embody the present lighting member as interior members or exterior members for vehicle, or as some of the part of the interior members or exterior members.

The present invention is not limited at all to the specific embodiment modes described above and illustrated in the drawings alone. That is, the present invention is executable while altering the embodiment modes reasonably or suitably within ranges not deviating from the gist. Moreover, the respective constituent elements disclosed in the present specification involving the embodiment modes are also executable while extracting any of them arbitrarily to combine with each other.

Having now fully described the present invention, it will be apparent to one of ordinary skill in the art that many changes and modifications can be made thereto without departing from the spirit or scope of the present invention as set forth herein including the appended claims.

What is claimed is:

1. A lighting member comprising:

a light guiding element having an outer peripheral face; and a housing including a cover element formed as a frame shape, being capable of deforming elastically and covering the outer peripheral face of the light guiding element over an entire circumference thereof, and a light-guiding-element attachment claw disposed integrally with the cover element, and protruding toward an inner side that is present on a more inside than is the outer peripheral face of the light guiding element, wherein the cover element of the housing has an inner peripheral face facing the outer peripheral face of the light guiding element, the cover element includes a larger-clearance portion providing a large clearance between the inner peripheral face of the cover element and the outer peripheral face of the light guiding element and a smaller-clearance portion providing therebetween a small clearance, which is smaller than the large clearance that the larger-clearance portion provides, the light-guiding-element attachment claw of the housing is disposed at the larger-clearance portion in the cover element of the housing, the cover element of the housing has an inner circumference formed as a non-true-circular shape, the cover element includes the larger-clearance portion in a quantity of one each at opposite ends thereof, where the inner circumference exhibits a maximum diameter, in a first axial direction thereof, and in a quantity of one each at other opposite ends in a second axial direction thereof intersecting with the first axial direction perpendicularly, and the light-guiding-element attachment claw is disposed at each of the larger-clearance portions.

2. The lighting member according to claim 1, wherein:

the cover element of the housing has an inner circumference formed as a non-true-circular shape;

the cover element includes the larger-clearance portion in a quantity of one each at opposite ends thereof, where the inner circumference exhibits a maximum diameter, in a first axial direction thereof; and the light-guiding-element attachment claw is disposed at each of the larger-clearance portions.

3. The lighting member according to claim 2, wherein the cover element of the housing includes the larger-clearance portions disposed at equal intervals.

4. The lighting member according to claim 1 further comprising a base element, wherein:

the housing further includes a base-element attachment claw disposed integrally with the cover element, and engaging with the base element; and the base-element attachment claw is disposed at a position avoiding the larger-clearance portion.

5. The lighting member according to claim 4, wherein the base-element attachment claw is disposed at the smaller-clearance portion.

6. The lighting member according to claim 1, wherein the cover element of the housing has the inner peripheral face formed as a teardrop shape.

7. The lighting member according to claim 1, wherein the cover element of the housing exhibits a maximum curvature at the larger-clearance portion.

8. The lighting member according to claim 1, wherein the cover element of the housing includes the larger-clearance portions disposed at equal intervals.

9. The lighting member according to claim 1, wherein the light guiding element includes a region subjected to a light diffusion treatment, the region having an area that grows gradually in an optical flow direction.

10. The lighting member according to claim 9, wherein the area changes from small to large at the larger-clearance portion in the optical flow direction.

11. The lighting member according to claim 1 further comprising a light introducing element that follows the light guiding element continuously to protrude therefrom and make a convex lens at a protruded end thereof.

* * * * *